United States Patent [19]

Harper

[11] Patent Number: 5,331,050
[45] Date of Patent: Jul. 19, 1994

[54] LOW VOC CLEAR EPOXY ACRYLIC COATING COMPOSITION FOR BASECOAT CLEAR COAT FINISH

[75] Inventor: Lee R. Harper, Media, Pa.

[73] Assignee: E. I. Du Pont de Nemours and Company, Wilmington, Del.

[21] Appl. No.: 25,924

[22] Filed: Mar. 3, 1993

Related U.S. Application Data

[62] Division of Ser. No. 719,951, Jun. 24, 1991, Pat. No. 5,215,783.

[51] Int. Cl.$^5$ ................................................. C08F 8/30
[52] U.S. Cl. ................................... 525/125; 524/507; 524/517; 524/548; 525/123
[58] Field of Search ................... 524/507, 517, 548; 525/123, 125

[56] References Cited

U.S. PATENT DOCUMENTS

| | | | |
|---|---|---|---|
| 4,491,646 | 1/1985 | Gruber et al. | 524/517 X |
| 4,609,690 | 9/1986 | Gruber et al. | 524/507 X |
| 4,988,759 | 1/1991 | Den Hartog et al. | 524/517 |
| 5,055,514 | 10/1991 | Kumada et al. | 524/507 X |
| 5,098,947 | 3/1992 | Metzger et al. | 525/123 X |
| 5,221,581 | 6/1993 | Palmer et al. | 524/507 X |

FOREIGN PATENT DOCUMENTS 3918968 12/1989 Fed. Rep. of Germany.

*Primary Examiner*—Judy M. Reddick
*Attorney, Agent, or Firm*—Hilmar L. Fricke

[57] ABSTRACT

An improved process for forming multiple coats of finishes on a substrate by sequential (a) applying to the substrate a layer of a color basecoat composition of waterborne coating composition of an acrylic polymer latex contains pigment; (b) applying to the layer of color basecoat composition before it is fully cured a clear coat composition of an acrylic polymer having crosslinkable groups and a crosslinking agent in a volatile organic solvent and (c) subsequently simultaneously curing the basecoat composition and the clear coat composition; the improvement used therewith comprises a solvent based clear coating composition having a binder of about 40–95% by weight of an epoxy acrylic polymer having at least one alkyl methacrylate having 2–12 carbon atoms in the alkyl group, and glycidyl methacrylate or acrylate and having a weight average molecular weight of about 3,000–10,000 and a glass transition temperature of about −20° to +50° C.; and 5–60% by weight an organic polyisocyanate; wherein the clear coat when cured has a water vapor permeability value of about 1400–3200.

15 Claims, No Drawings

LOW VOC CLEAR EPOXY ACRYLIC COATING COMPOSITION FOR BASECOAT CLEAR COAT FINISH

This is a division of application Ser. No. 07/719,951, filed Jun. 24, 1991 now U.S. Pat. No. 5,215,783.

BACKGROUND OF THE INVENTION

This invention is directed to an improved process for applying a low VOC (volatile organic content) solvent based clear coating composition over a waterborne base coating to form a clear coat/basecoat finish of automotive quality and appearance.

Waterborne coating compositions useful for basecoats for automotive applications are shown in Den Hartog et al U.S. Pat. No. 4,954,559 issued Sep. 4, 1990. The application of a clear coat to a basecoat in a "wet on wet" application is shown in Kurauchi et al U.S. Pat. No. 4,728,543 issued Mar. 1, 1988 and Benefiel et al U.S. Pat. No. 3,639,147 issued Feb. 1, 1972. However, none of the compositions or processes shown in the art form a clear coat/basecoat finish wherein the clear coat is formed from a solvent based composition and the color coat is formed from a waterborne composition and wherein the finish has properties that are required for exterior finishes of automobiles and trucks and the compositions meet desired standards of overall low solvent emissions.

One problem in particular that has been encountered with clear coat/basecoat finishes is the degradation and delamination of the clear coat from a waterborne basecoat upon weathering. Moisture penetration of the clear coat is believed to cause at least a part of the aforementioned problem. The novel process of this invention which uses a particular clear coat forms a clear coat/basecoat finish of automotive quality that is weatherable and durable and the process meets current standards of solvent emissions.

SUMMARY OF THE INVENTION

An improved process for forming multiple coats of finishes such as a basecoat/clear coat finish on a substrate using the following sequential steps of (a) applying to the substrate a color basecoat composition of a waterborne basecoat having a film forming binder of an acrylic polymer latex and contains pigment in a pigment to binder ratio of about 1:100 to 150:100 dispersed in an aqueous medium; (b) applying to the layer of the color basecoat composition before the basecoat composition is fully cured, a clear coat composition of an acrylic polymer having crosslinkable groups and a crosslinking agent in a volatile organic solvent and (C) subsequently simultaneously curing the basecoat composition and the clear coat composition; the improvement that is used with this process is a clear coating composition that contains about 40–80% by weight, based on the weight of the coating composition, of a binder and correspondingly, about 20–60% by weight of a volatile organic solvent; wherein the binder contains about 40–95% by weight, based on the weight of the binder, of an epoxy acrylic polymer of polymerized monomers of at least one alkyl methacrylate and glycidyl methacrylate or glycidyl acrylate and optionally, contains a hydroxy acrylic polymer of at least two alkyl methacrylates having about 2–12 carbon atoms in the alkyl group and a hydroxy alkyl methacrylate having 2–4 carbon atoms in the alkyl group and the epoxy acrylic polymer and hydroxy acrylic polymer each have a weight average molecular weight of about 3,000–10,000 and a glass transition temperature of about $-20°$ to $+50°$ C.; and 5–65% by weight, based on the weight of the binder, of an organic polyisocyanate crosslinking agent and wherein a cured layer of the clear coat has a water permeability value of about 1400–3200.

Another aspect of this invention is an article coated by the above process and the clear coating composition.

DETAILED DESCRIPTION OF THE INVENTION

Weight average molecular weight is determined by gel permeation chromatography using polymethyl methacrylate as the standard.

Glass transition temperature is determined by differential scanning colorimetry.

Water permeability is determined by the procedure described in Yasuda, H. and Stennett, V., Journal of Polymer Science, vol.5, p.907 (1962). The water vapor permeability value is expressed as cc water vapor at STP/$cm^2$ of film/cm thickness of film/sec/cm Hg.

The term "latex" as used herein means a dispersion in an aqueous carrier of polymer particles having a particle size of about 0.06–0.20 microns and a weight average molecular weight of greater than 500,000.

The term "hydrosol" as used herein means a fine dispersion in an aqueous carrier of polymer particles having a particle size of less than 0.30 microns, preferably less than 0.15 microns and more preferably less than 0.01 microns and a weight average molecular weight of less than 100,000.

The clear coating composition used in the process of this invention has a low VOC (volatile organic content) and forms a finish that is hard, glossy, weatherable and durable. In particular, the composition has excellent adhesion to a coating of a waterborne acrylic polymer and to a variety of other substrates such as previously painted substrates, cold rolled steel, phosphatized steel, steel coated with conventional primers such as electrodeposition primers that typically are crosslinked epoxy polyesters and various epoxy resin, alkyd resin repair primers, plastic substrates such as polyester reinforced fiber glass, reaction injection molded urethanes and partially crystalline polyamides.

The clear coating composition has a film forming binder content of about 40–80% by weight and correspondingly, about 20–60% by weight of a volatile organic solvent or blend of solvents for the binder. The composition may contain very small amounts of pigment to eliminate color such as yellowing and may contain transparent pigments having the same or similar refractive index as the binder to improve weatherability and durability of the resulting clear coat. Typically useful pigments have a particle size of about 0.015–50 microns and are used in a pigment to binder weight ratio of about 1:100 to 10:100 and are for example inorganic siliceous pigments such as silica pigments having a refractive index of about 1.4–1.6.

The film forming binder of the clear coating composition contains about 40–95% by weight of an epoxy acrylic polymer and about 5–60% by weight of an organic polyisocyanate crosslinking agent. The epoxy acrylic polymer is of polymerized monomers of at least one alkyl methacrylate having 2–12 carbon atoms in the alkyl group and a glycidyl methacrylate or a glycidyl acrylate. Optionally, the composition may contain about 1–30% by weight, based on the weight of the binder, of a hydroxy acrylic polymer of polymerized monomers of at least two alkyl methacrylates having 2–12 carbon atoms in the alkyl group and hydroxy alkyl methacrylate having 2–4 carbon atoms in the alkyl group.

The epoxy acrylic polymer has a weight average molecular weight of about 3,000–10,000 and preferably 3,000–8,000 and a glass transition temperature of about −20° to +50° C., preferably, 0°–35° C. The hydroxy acrylic polymer has a weight average molecular weight and a glass transition temperature in the above ranges. If the hydroxy acrylic polymer is used, it has the same molecular weight and glass transition temperature as above and preferably contains about 70–90% by weight of at least two alkyl methacrylates and 10–30% by weight of a hydroxy alkyl methacrylate.

Typically useful alkyl methacrylates for the above polymers are ethyl methacrylate, propyl methacrylate, isopropyl methacrylate, butyl methacrylate, isobutyl methacrylate, pentyl methacrylate, hexyl methacrylate, 2-ethyl hexyl methacrylate, nonyl methacrylate, lauryl methacrylate and the like.

Typically useful hydroxy alkyl methacrylates for the hydroxy acrylic polymer are hydroxy ethyl methacrylate, hydroxy propyl methacrylate, hydroxy butyl methacrylate and the like.

Both the epoxy acrylic polymer and hydroxy acrylic polymer may contain about 0.5–40% by weight of polymerized styrene monomer.

Preferably, the epoxy acrylic polymer is prepared by group transfer polymerization (GTP) in which a GTP compound such as 1-(2-trimethylsiloxy)ethoxy-1-trimethyl siloxy-2-methyl propene is used with monomer such as glycidyl methacrylate and an alkyl methacrylate such as iso-butyl methacrylate. Preferred epoxy acrylic polymers contains about 20–60% by weight of glycidyl methacrylate or acrylate and correspondingly about 80–40% by weight alkyl methacrylate such as iso-butyl methacrylate. One preferred epoxy acrylic polymer that can be prepared by GTP contains trimethyl silane protected hydroxy ethyl methacrylate/isobutyl methacrylate/glycidyl methacrylate in a mole ratio of 1/8/8.

One preferred hydroxy acrylic polymer which is prepared by conventional solution polymerization process contains about 20–40% by weight of isobutyl methacrylate, 35–65% by weight of 2-ethylhexyl methacrylate and 15–30% by weight of 2-hydroxy ethyl methacrylate.

The water vapor permeability of a finish can be reduced by using an epoxy acrylic polymer and/or a hydroxy acrylic polymer formed with monomers that have bulky side chains such as iso-butyl methacrylate or 2-ethyl hexyl methacrylate.

Both the epoxy acrylic polymer and the hydroxy acrylic polymer can be prepared by a conventional solution polymerization process in which the monomers, solvents and polymerization catalyst are heated to about 140°–160° C. for about 2–4 hours to form the polymers.

Typical polymerization catalyst are azo type catalyst such as azo-bis-isobutyronitrile, 1,1'-azobis (cyanocyclohexane), acetate catalyst such as t-butyl peracetate, di-t-butyl peroxide, t-butyl perbenzoate, t-butyl peroctoate and the like.

Typical solvents that can be used are ketones such as methyl amyl ketone, methyl isobutyl ketone, methyl ethyl ketone, aromatic hydrocarbons such as toluene, xylene, alkylene carbonates such a propylene carbonate, n-methyl pyrrolidone, ethers, esters, acetates and mixtures of any of the above.

The organic polyisocyanate crosslinking agent can be any of the conventional aromatic, aliphatic, cycloaliphatic diisocyanates, trifunctional isocyanate, and isocyanate functional adducts of a polyol and a diisocyanate. Typical diisocyanates that can be used are for example 1,6-hexamethylene diisocyanate, isophorone diisocyanate, 4,4'-biphenylene diisocyanate, toluene diisocyanate, bis cyclohexyl diisocyanate, tetramethyl xylene diisocyanate, ethylethylene diisocyanate, 2,3-dimethyl ethylene diisocyanate, 1-methyltrimethylene diisocyanate, 1,3-cyclopentylene diisocyanate, 1,4-cyclohexylene diisocyanate, 1,3-phenylene diisocyanate, 1,5-naphthalene diisocyanate, bis-(4-isocyanatocyclohexyl)-methane, 4,4'-diisocyanatodiphenyl ether and the like.

Typical trifunctional isocyanates that can be used are triphenylmethane triisocyanate, 1,3,5-benzene triisocyanate, 2,4,6-toluene triisocyanate and the like. Trimers of diisocyanates can also be used such as the trimer of hexamethylene diisocyanate which is sold under the tradename "Desmodur" N-3390.

Isocyanate functional adducts can be used that are formed from an organic polyisocyanate and a polyol. Any of the aforementioned polyisocyanates can be used with a polyol to form such adducts. Polyols such as trimethylol alkanes like trimethylol propane or ethane can be used. One preferred adduct is formed from tetramethylxylidene diisocyanate and trimethylol propane and is sold under the tradename "Cythane" 3160.

To improve weatherablity of the composition, about 0.1–10% by weight of ultraviolet light stabilizers, screeners, quenchers and antioxidants can be added. Typical ultraviolet light screeners include benzophenones, benzoates, triazines, triazoles, hindered amines and any mixtures thereof. Typically useful hindered amine ultraviolet light stabilizers are bis(1,2,2,5,6 pentamethyl-4-piperidinyl sebacate), di[4(2,2,6,6 tetramethyl piperidinyl)] sebacate and the like.

The clear coating composition contains a sufficient amount of a catalyst to cure the composition at ambient temperatures. Typically useful catalysts are alkyl metal catalysts such as dibutyl tin dilaurate, dibutyl tin oxide, amines such as triethylene diamine and tertiary amines, aluminum halides, lithium halide complexes, stibonium halides and 1,3-disubstituted imidazole-2-thiones. Dibutyl tin dilaurate is a preferred catalyst that provides a finish with desired properties within a relatively short period of time.

One typically useful aqueous basecoating composition has a film forming binder of about 60–90% by weight of a methylol (meth)acrylamide acrylic latex and about 10–40% by weight of an acrylic hydrosol polymer. This composition can be cured at ambient temperatures.

The latex and hydrosol polymers each contain methylol (meth)acrylamide and form an aqueous polymer system that crosslinks on curing at ambient temperatures to form a crosslinked finish having excellent adhesion, water resistance, solvent resistance, hardness, durability and weatherability as is required for an automotive or a truck finish. The hydrosol polymer preferably contains the same or similar monomers as the latex polymer and is compatible with the latex polymer and readily crosslink on curing. In particular, the latex polymer and the hydrosol polymer contain the same or very similar amounts of carboxyl and hydroxyl monomers which improves the humidity performance of finishes formed from coatings containing such polymers.

Because the hydrosol polymer is relatively low in molecular weight in comparison to the latex polymer, it is more mobile than the latex polymer particles and fills the voids formed by the latex polymer particles upon drying. This substantially improves the physical properties of the resulting film or finish.

The methylol (meth)acrylamide of the latex and hydrosol polymers reacts with itself or with another hydroxy group thereby forming a crosslinked film or finish.

The acrylic latex polymer is formed by conventional emulsion polymerization by emulsifying a mixture of monomers, water, surfactant and polymerization catalyst and charging the resulting emulsion into a conventional polymerization reactor and heating the constituents in the reactor to about 60°-95° C. for about 15 minutes to 8 hours and then the resulting polymer is neutralized with ammonia or an amine. The size of the polymeric particles of the latex is about 0.06–0.20 microns. The resulting polymer has a hydroxyl no. of 2-100, a glass transition temperature of −40° to +40° C. and a weight average molecular weight of about 500,000–3,000,000.

The acrylic latex polymer used in the basecoat contains about 1-15% by weight of polymerized methylol methacrylamide, methylol acrylamide or any mixtures thereof.

The acrylic latex polymer preferably contains sufficient polymerized hydroxy alkyl methacrylate or acrylate having 2-4 carbon atoms in the alkyl group to provide the polymer with a hydroxyl no. of 2-100. Usually, about 0.5-10% by weight of hydroxy alkyl acrylate or methacrylate is used. Other useful polymerizable constituents are reaction products of an alkyl methacrylate or acrylate and a lactone. A constituent of this type is "Tone" 100 made by Union Carbide which is believed to be the reaction product of hydroxyethyl acrylate and a lactone.

The acrylic latex polymer also contains sufficient polymerized monoethylenically unsaturated acid monomers. Typically useful monoethylenically unsaturated acids are methacrylic acid, acrylic acid, iraconic acid, styrene sulfonic acid and salts thereof. Usually, these unsaturated acids are used in an amount of about 0.5-10% by weight, based on the weight of the polymer.

The remaining constituents of the acrylic latex polymer are polymerized alkyl acrylates and/or methacrylates preferably, having about 1-12 carbon atoms in the alkyl group. These constituents are blended to provide the desired polymer glass transition temperature. Also, up to about 30% by weight of styrene can be used to form the acrylic latex polymer.

The following are particularly useful acrylic latex polymers:

an acrylic polymer containing about 30-40% by weight methyl methacrylate, 10-20% by weight styrene, 35-45% by weight 2-ethylhexyl acrylate, 1-6% by weight methylol methacrylamide, 1-5% by weight hydroxyethyl acrylate and 1-5% by weight methacrylic acid;

an acrylic polymer containing about 25-35% by weight methyl methacrylate, 10-20% by weight styrene, 44-55% by weight 2-ethylhexyl acrylate, 1-6% by weight methylol methacrylamide, 1-5% by weight hydroxyethyl acrylate and 1-5% by weight methacrylic acid;

an acrylic graft copolymer of stage I of 10-30% by weight of methyl methacrylate, 1-5% by weight methylol methacrylamide, 70-89% by weight butyl acrylate grafted to stage II of 70-80% by weight of butyl acrylate, 5-15% by weight methylol methacrylamide, 5-15% by weight hydroxyethyl acrylate and 5-9% by weight methacrylic acid; and a three stage acrylic graft copolymer polymer, wherein stage I and stage II each comprise methyl methacrylate and butyl acrylate, and stage III comprises methyl methacrylate, butyl acrylate and methylol methacrylamide.

The acrylic hydrosol polymer is formed by conventional solution polymerization by adding a mixture of monomers, solvent and polymerization catalyst to a conventional polymerization reactor and heating the constituents in the reactor to reflux temperature of the solvent of about 60°-120° C. for about 15 minutes to 8 hours to form a polymer solution. Then water and ammonia or an amine are added to the polymer solution to form a hydrosol. The size of the polymeric particles of the hydrosol is less than 0.30 microns. The resulting polymer has a hydroxyl no. of 2-100, a glass transition temperature of −40° to +45° C. and a weight average molecular weight of about 5,000-75,000.

Typical catalysts used to form the hydrosol polymer, benzoyl peroxide, hydrogen peroxide and other peroxy compounds used for acrylic free radical polymerization, tertiary butylperacetate, tertiary butyl peroctoate, azoisobutyronitrile and other "Vazo" catalysts that are used for acrylic free radical polymerization.

Typically useful solvents are alcohols such as n-propanol, ethanol, methanol, n-butanol, mono and dialkyl ethers of ethylene glycol, such as ethylene glycol monobutyl ether, ethylene glycol monobutyl ether acetate, ethylene glycol dibutyl ether and the like.

The acrylic hydrosol polymer contains about 1-30% by weight of polymerized methylol methacrylamide, methylol acrylamide or any mixtures thereof.

The acrylic hydrosol polymer preferably contains sufficient polymerized hydroxy alkyl methacrylate or acrylate having 2-4 carbon atoms in the alkyl group to provide the polymer with a hydroxyl no. of 2-100. Usually, about 0.5-10% by weight of hydroxy alkyl acrylate or methacrylate is used. Typically useful monomers are shown above. Other useful polymerizable constituents are reaction products of an alkyl methacrylate or acrylate and a lactone such as "Tone" 100 described above.

The acrylic hydrosol polymer also contains sufficient polymerized monoethylenically unsaturated acid monomers. Typically useful monoethylenically unsaturated acids are methacrylic acid, acrylic acid, itaconic acid, styrene sulfonic acid and salts thereof. Usually, these unsaturated acids are used in an amount of about 0.5-10% by weight, based on the weight of the polymer.

The remaining constituents of the acrylic hydrosol polymer are polymerized alkyl acrylates and/or methacrylates preferably having about 1-12 carbon atoms in the alkyl group. These constituents are blended to provide the desired polymer glass transition temperature.

Typically useful monomers are described above. Also, up to about 40% by weight of styrene can be used to form the hydrosol polymer.

The following are particularly useful acrylic hydrosol polymers:

an acrylic polymer containing about 25-50% by weight methyl methacrylate (MMA), 10-30% by weight styrene (S), 25-50% by weight 2-ethylhexyl acrylate (2-EHA) or 2-ethylhexyl methacrylate (2-EHMA), 2-10% by weight methylol methacrylamide (MOLMAM), 2-10% by weight hydroxyethyl acrylate (HEA) and 1-6% by weight methacrylic acid (MMA);

The hydrosol polymer can contain about 0.1-2% by weight of polymerized surface active monomers such as SAM 185 having an HLB value of 6.9, SAM 186 having an HLB value of 9.9 and SAM 187 having an HLB value 14.0. These monomers are supplied by PPG-MAZER, Chemicals Group Technical Center, PPG Industries, Inc., 440 College Park Drive, Monroeville, PA. These monomers are characterized by the structure:

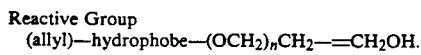

where n is 1-100.

Another useful surface active monomer is the sodium salt of allyl dodecyl sulfosuccicnate. These monomers are supplied by HenkelChemical Corp., Ambler, PA under the trade name TREM LF-40. Mixtures of any of the above surface active monomers can be used.

About 0.1-5% by weight, based on the weight of the coating composition, of carbodiimides or polyfunctional aziridines can be added to the waterborne coating composition which provide for additional crosslinking sites. These compounds can be added to the acrylic latex or acrylic hydrosol or to the resulting coating composition. Typically useful carbodiimides have the following structural formula:

where $R_1$ and $R_2$ are alkyl groups containing 1-8 carbon atoms. One particularly useful carbodiimide is "UCARLNK" Crosslinker XL-25SE made by Union Carbide Corporation.

Useful polyfunctional aziridines include trimethylolpropane-tris-[B-(N-aziridinyl)propionate] and pentaerythritol-tris-[B-(N-aziridinyl)propionate].

Pigments are used in the waterborne basecoating composition generally in a pigment to binder ratio of about 1:100 to 200:100. Typical pigments that can be used are metallic oxides such as titanium dioxide, zinc oxide, iron oxides of various colors, carbon black, filler pigments such as talc, china clay, barytes, carbonates, silicates, and a wide variety of organic colored pigments such as quinacridones, copper phthalocyanines, perylenes, azo pigments, indanthrone blues, carbazoles such as carbazole violet, isoindolinones, isoindolones, thioindigo reds, benzimidazolinones and the like.

When the coating contains metallic pigments, agents which inhibit the reaction of the pigments with water may be added. Typical inhibitors are phosphated organic materials such as "Vircopet" 40 available from Mobil Chemical Co.

The waterborne basecoating composition can contain about 0.01-2% by weight, based on the weight of the binder, of any of the aforementioned ultraviolet light stabilizers which includes ultraviolet light absorbers, screeners and quenchers that are used in the clear coat.

Thickeners and theology control agents can be added to the waterborne basecoating composition in amounts of about 0.5-10% by weight of the coating composition to provide the desired spray viscosity. Typically, acrylic polymers such as polyacrylic acid, clays such as "Bentones" cellulosics, urethanes, silicas, associative thickeners such as "Rheolate" 255 or compatible mixtures of any of the above can be added.

Both the clear coating composition and the basecoating composition can be applied to plastic or metal substrates by conventional techniques such as spraying, electrostatic spraying, dipping, brushing, flowcoating and the like. The preferred method is spraying.

In applying the clear coat/basecoat, a basecoat of the waterborne pigmented coating composition is applied to a substrate which may be primed with a conventional primer or primed and sealed by one of the aforementioned coating methods. Spraying is usually used. The coating is applied to a dry film thickness of about 0.1-3.0 mils. The basecoat usually is dried but not fully cured either at ambient temperatures for about 5-30 minutes or at elevated temperatures for shorter period of time. A clear coating is then applied by one of the aforemetioned methods, usually spraying or electrostatic spraying is used. About 1-5 mils (dry film thickness) of the clear layer is applied. The clear coat/basecoat is then cured at ambient temperatures.

The following example illustrates the invention. All parts and percentages are on a weight basis unless otherwise indicated.

EXAMPLE 1

A clear solvent based coating composition is formed by preparing an epoxy acrylic polymer, a hydroxy acrylic polymer and then blending these polymers with a polyisocyanate and other constituents.

The epoxy acrylic polymer is prepared by charging the following constituents into a polymerization reactor equipped with an addition funnel, a reflux condenser, a heating source and a thermometer:

|  | Parts by Weight |
|---|---|
| Portion 1 | |
| Tetrahydrofuran | 469.304 |
| 1-(2-trimethylsiloxy)ethoxy-1-trimethylsiloxy-2-methyl propene | 36.080 |
| Glycidyl methacrylate monomer | 112.440 |
| Iso-butyl methacrylate monomer | 37.100 |
| Portion 2 | |
| Tetrabutyl ammonium chlorobenzoate | 0.286 |
| Tetrahydrofuran | 0.571 |
| Portion 3 | |
| Tetrahydrofuran | 2.143 |
| Tetrabutyl ammonium chlorobenzoate | 0.286 |
| Portion 4 | |
| Glycidyl methacrylate monomer | 37.100 |
| Iso-butyl methacrylate monomer | 112.440 |
| Portion 5 | |
| Methanol | 8.250 |
| Glacial acetic acid | 4.000 |
| Portion 6 | |
| Butyl acetate | 144.110 |
| Glacial acetic acid | 4.100 |
| Total | 968.210 |

The ingredients for Portion 1 are dried over molecular sieves and then charged into a polymerization reactor and cooled to −5° C. Portion 2 is slowly added over a 30 minute period. Addition is stopped when the reaction begins to exotherm and cooling is resumed when the temperature rises to 10°–15° C. Addition is continued until all of Portion 1 is added. When 75% of the monomers are converted, Portions 3 and 4 are added simultaneously. Portion 3 is added over a 40 minute period and Portion 4 is added over a 30 minute period. When complete conversion of the monomers has occurred, the ingredients of Portion 5 are added in the order listed providing a polymer solution of about 40% solids. Portion 6 is added and the resulting polymer solution is distilled until the resulting solution has a 65% solids content.

The hydroxy acrylic polymer is prepared by charging the following constituents into a polymerization reactor equipped as above:

|  | Parts by Weight |
|---|---|
| Portion 1 | |
| Methyl amyl ketone | 163.77 |
| Portion 2 | |
| Iso-butyl methacrylate | 177.27 |
| 2-ethylhexyl methacrylate | 230.49 |
| 2-hydroxypropyl methacrylate | 143.55 |
| Portion 3 | |
| Methyl amyl ketone | 34.90 |
| t-butyl peracetate | 26.59 |
| Portion 4 | |
| Methyl amyl ketone | 24.43 |
| Total | 801.00 |

Portion 1 is charged into the reactor and heated to its reflux temperature of about 150°–155° C. Portion 2 is premixed and added to the reactor at a uniform rate over a 150 minute period with constant agitation and maintaining the above reflux temperature. Portion 3 is charged into the reactor over 165 minute period along with Portion 2 and the reaction mixture is held at its reflux temperature for an additional hour. Portion 4 is added and the mixture is allowed to cool to ambient temperature.

The resulting hydroxy acrylic polymer solution has a solids content of 68%, A Gardner-Holdt viscosity of Q measured at 25° C. and the polymer has an acid no. of 8.5 and a weight average molecular weight of about 5,000.

A clear coating composition is prepared by thoroughly mixing together the following constituents:

|  | Parts by Weight |
|---|---|
| Portion 1 | |
| Hydroxy acrylic polymer solution (prepared above) | 27.22 |
| Epoxy acrylic polymer solution (prepared above) | 77.97 |
| Tinuvin ® 1130 UV light absorber (from Ciba-Geigy reaction product of β-3-(2H-benzotriazole-2-yl)-4-hydroxy-5-tert-butyl phenyl propionic acid methyl ester and propylene glycol 300) | 3.51 |
| CGL123 HALS antioxidant (hindered amine from Ciba-Geigy) | 2.34 |
| Resiflow S flow control agent (from Monsanto) | 0.88 |
| Acetyl acetone | 6.04 |
| Dibutyl tin dilaurate solution (10% solids in xylene) | 1.52 |
| Portion 2 | |
| Polyisocyanate solution (made by | 66.82 |

|  | Parts by Weight |
|---|---|
| *-continued* | |
| diluting 69.97 parts Desmodur ® 3390[1] with 30.03 parts xylene) | |
| Portion 3 | |
| Solvent blend (70/30 PM acetate/hexyl acetate) | 6.85 |
| Methyl ethyl ketone | 6.86 |
| Total | 200.01 |

Desmodur ® 3390[1]—1,6-hexamethylene diisocyanate based adduct: 90% solids solution in PM acetate and hydrocarbon solvent 1/1 ratio from Mobay.

The resulting coating composition had a solids content of 58.72%, VOC 3.44 lb/gal., viscosity (No. 2 Zahn cup) 33 sec., visosity after 4 hours at room temperature 46 seconds, time to tack free state after application to a substrate 1.75 hours.

A Primer Composition was prepared as follows:
Millbase preparation:

|  | Parts by Weight |
|---|---|
| Triton X-100 (nonionic surfactant - nonyl phenoxy ethyleneoxy ethanol 10 moles EO) | 1.38 |
| Deionized water | 39.62 |
| Aqueous ammonium hydroxide solution (29% solution) | 0.39 |
| "Tamol" 901 (made by Rohm & Hass, ammonium salt of acrylic copolymer dispersant) | 1.48 |
| Talc | 34.25 |
| Aluminum silicate pigment | 17.13 |
| Carbon black pigment | 0.04 |
| Titanium dioxide pigment | 5.71 |
| Total | 100.00 |

The above constituents are charged into a sand mill and ground to form a uniform dispersion.

The following ingredients were added in order with mixing to form a primer.

|  | Parts by Weight |
|---|---|
| Pine oil | 7.20 |
| Latex A[2] | 216.22 |
| Acrylic Hydrosol[3] | 100.00 |
| Blend 1 (deionized water 23.57, "Butyl Cellosolve" 3.58, aqueous ammonium hydroxide solution 1.57 and "Acrysol" TT615-Rohm & Hass acrylic acid copolymer thickner 4.10) | 14.40 |
| Mill base (prepared above) | 315.07 |
| Total | 652.89 |

Latex A[2]—acrylic polymer dispersed in water and having weight solids of 38.4%, volume solids 35.7%, pH of 8.5, the acylic polymer contains methyl methacrylate/styrene/n-methylol methacrylamide/2-hydroxy ethyl acrylate/methacrylic acid in a weight ratio of 27/15/49/3/3/3 and a weight average molecular weight of 500,000–1,250,000 and is neutralized with ammonium hydroxide and has a particle size of about 0.094 microns.
Acrylic Hydrosol[3]—acrylic polymer fine dispersion in water having a polymer solids content of 20%, the acrylic polymer contains methyl methacrylate/styrene/n-methylol methacrylamide/2-hydroxy ethy acrylate/methacrylic acid in a weight ratio of 31/22/34/3/3 and has a weight average molecular weight of about 40,000 and is neutralized with ammonium hydroxide.

The resulting primer composition has a solids content of about 42%, and a pigment/binder ratio of 180:100.

The primer was sprayed onto cold-rolled steel panels and dried at ambient temperature. The primer had a dry film thickness of about 1.8–2.2 mils.

A silver basecoating composition was prepared by mixing together the following constituents in the order shown and thoroughly blending these constituents:

| | Parts by Weight |
|---|---|
| Butyl Cellosolve ® | 13.42 |
| Inhibitor solution (phosphated organic material) | 10.68 |
| Aluminum Flake Dispersion (65% solids aluminum flake in mineral spirits) | 23.04 |
| Butyl Cellosolve ® | 14.96 |
| Blend 1 (described above) | 30.00 |
| Deionized water | 198.00 |
| Latex A (described above) | 193.00 |
| Acrylic Hydrosol (described above) | 99.50 |
| Total | 582.60 |

The resulting composition had a volume solids content of 15.04 and a pigment/binder ratio of 15/100.

The basecoat was sprayed onto the above prepared primed cold-rolled steel panels and flash dried and the clear coating prepared above was spray applied and both of the coatings were dried at ambient temperatures for about 2.25 hours to form a tack free finish having a high gloss and a very good appearance. The resulting basecoat had a dry film thickness of about 0.6–0.8 mils. and the clear coat had a dry film thickness of about 1.8–2.1 mils.

The finish on the panels had the following properties:
Hardness (Persoz) after 1 day —66
Hardness (Persoz) after 3 days—86
Hardness (Persoz) after 7 days—106

The above data shows that additional cure of the finish occurred at ambient temperatures to improve hardness properties of the finish.

EXAMPLE 2

A clear solvent based coating composition is formed by preparing an epoxy acrylic polymer and then blending these polymers with a polyisocyanate and other constituents.

The epoxy acrylic polymer is prepared by charging the following constituents into a polymerization reactor equipped with an addition funnel, a reflux condenser, a heating source and a thermometer:

| | Parts by Weight |
|---|---|
| Portion 1 | |
| Isobutyl methacrylate monomer | 495.54 |
| 2-Ethylhexyl methacrylate monomer | 434.70 |
| Glycidyl methacrylate monomer | 188.10 |
| Toluene | 805.20 |
| Cobalt complex solution (0.17% solution cobalt complex with diphenyl glyoxime in methyl ethyl ketone) | 60.35 |
| Portion 2 | |
| 1,1'-Azobis (cyanocyclohexane) | 0.99 |
| Toluene | 38.03 |
| Portion 3 | |
| Toluene | 76.36 |
| Isobutyl methacrylate monomer | 353.33 |
| Glycidyl methacrylate monomer | 213.95 |
| 2-Ethylhexyl methacrylate monomer | 414.28 |
| 1,1'Azobis (cyanocyclohexane) | 3.71 |
| Portion 4 | |
| Toluene | 228.07 |
| 1,1'Azobis (cyanocyclohexane) | 0.91 |
| Total | 3312.52 |

Portion 1 is added to the polymerization reactor and the resulting mixture is heated to its reflux temperature under an atmosphere of nitrogen. Portion 2 is added over a 10 minute period. Portion 3 is premixed and slowly added over a 4 hour period at a uniform rate while holding the reaction mixture at its reflux temperature and then the reaction mixture is held at its reflux temperature for an additional 30 minutes. Portion 4 is added over a 60 minute period. The resulting polymer solution is cooled to ambient temperature.

A clear coating composition is prepared by thoroughly mixing together the following constituents:

| | Parts by Weight |
|---|---|
| Portion 1 | |
| Epoxy acrylic polymer solution (prepared above) | 101.13 |
| Tinuvin ® 1130 UV light absorber (described in Example 1) | 3.46 |
| CGL123 HALS antioxidant (hindered amine from Ciba-Geigy) | 2.30 |
| Resiflow S flow control agent (from Monsanto) | 0.86 |
| Acetyl acetone | 8.90 |
| Dibutyl tin dilaurate solution (10% solids in xylene) | 0.75 |
| Portion 2 | |
| Polyisocyanate solution (described Example 1) | 71.12 |
| Portion 3 | |
| Solvent blend (70/30 PM acetate/hexyl acetate) | 1.36 |
| Methyl ethyl ketone | 10.11 |
| Total | 200.00 |

The resulting coating composition had a solids content of 55.73%, VOC 3.61 lb/gal., viscosity (No. 2 Zahn cup) 22 sec., visosity after 4 hours at room temperature 23 seconds, time to tack free state after application to a substrate 8.00 hours.

The primer prepared in Example 1 was sprayed onto cold-rolled steel panels and dried at ambient temperature. The primer had a dry film thickness of about 1.8–2.2 mils.

The basecoat prepared in Example 1 was sprayed onto the above prepared primed cold-rolled steel panels and flash dried and the clear coating prepared above was spray applied and both of the coatings were dried at ambient temperatures for about 8.00 hours to form a tack free finish having a high gloss and a very good appearance. The resulting basecoat had a dry film thickness of about 0.6–0.8 mils and the clear coat had a dry film thickness of about 1.8–2.1 mils.

The finish on the panels had the following properties:
Hardness (Persoz) after 1 day—38
Hardness (Persoz) after 3 days—45
Hardness (Persoz) after 7 days—89 T he above data shows that additional cure of the finish occurred at ambient temperatures to improve hardness properties of the finish.

What is claimed is:

1. A coating composition comprising about 40–80% by weight, based on the weight of the coating composition, of binder in volatile organic solvent; wherein the binder consists essentially of about 40–95% by weight, based on the weight of the binder, of an epoxy acrylic polymer consisting essentially of polymerized monomers of at least one alkyl methacrylate having 2–12 carbon atoms in the alkyl group and a glycidyl methacrylate or glycidyl acrylate and having a weight average molecular weight of about 3,000–10,000 and a glass transition temperature of about −20° to +50° C.;

5-60% by weight, based on the weight of the binder of an organic polyisocyanate crosslinking agent; and a sufficient amount of catalyst to cure the binder;

wherein the coating composition when cured has a water vapor permeability value of about 1400-3200.

2. The coating composition of claim 1 which contains about 0.1-10% by weight, based on the weight of the binder, of antioxidants and ultraviolet light absorbers.

3. The coating composition of claim 1 in which the epoxy acrylic polymer consists essentially of 20-60% by weight of glycidyl methacrylate and 80-40% by weight of an alkyl methacrylate.

4. The coating composition of claim 3 in which the epoxy acrylic polymer consists essentially of 20-60% by weight of glycidyl methacrylate and 80-40% by weight of iso-butyl methacrylate.

5. A coating composition comprising about 40-80% by weight, based on the weight of the coating composition, of binder in volatile organic solvent; wherein the binder consists essentially of about 40-95% by weight, based on the weight of the binder, of an epoxy acrylic polymer consisting essentially of polymerized monomers of at least one alkyl methacrylate having 2-12 carbon atoms in the alkyl group, a glycidyl methacrylate or glycidyl acrylate and 0.5-40% by weight of styrene and having a weight average molecular weight of about 3,000-10,000 and a glass transition temperature of about −20° to +50° C.;

5-60% by weight, based on the weight of the binder of an organic polyisocyanate crosslinking agent; and a sufficient amount of catalyst to cure the binder; and wherein the coating composition when cured has a water vapor permeability value of about 1400-3200;

6. A coating composition comprising about 40-80% by weight, based on the weight of the coating composition, of binder in volatile organic solvent; wherein the binder consists essentially of about 39-65% by weight, based on the weight of the binder, of an epoxy acrylic polymer consisting essentially of polymerized monomers of at least one alkyl methacrylate having 1-12 carbon atoms in the alkyl group and a glycidyl methacrylate or glycidly acrylate and having a weight average molecular weight of about 3,000-10,000 and a glass transition temperature of about −20° to +50° C.;

1—30% by weight, based on the weight of the binder, of a hydroxy acrylic polymer consisting essentially of polymerized monomers of at least two alkyl methacrylates having 2-12 carbon atoms in the alkyl group and a hydroxy alkyl methacrylate having 2-4 carbon atoms in the alkyl group and having a weight average molecular weight of about 3,000-10,000 and a glass transition temperature of about −20° to +50° C.;

5-60% by weight, based on the weight of the binder of an organic polyisocyanate crosslinking agent; and a sufficient amount of catalyst to cure the binder; and wherein the coating composition when cured has a water vapor permeability value of about 1400-3200.

7. The coating composition of claim 6 in which the hydroxy acrylic polymer consists essentially of 70-90% by weight of at least two alkyl methacrylates and 10-30% by weight of hydroxy alkyl methacrylate.

8. A coating composition comprising about 40-80% by weight, based on the weight of the coating composition, of binder in volatile organic solvent; wherein the binder consists essentially of about 39-65% by weight, based on the weight of the binder, of an epoxy acrylic polymer consisting essentially of polymerized monomers of at least one alkyl methacrylate having 2-12 carbon atoms in the alkyl group, a glycidyl methacrylate or glycidyl acrylate and 0.5-40% by weight styrene and having a weight average molecular weight of about 3,000-10,000 and a glass transition temperature of about −20° to +50° C.;

1-30% by weight, based on the weight of the binder, of a hydroxy acrylic polymer consisting essentially of polymerized monomers of at least two alkyl methacrylates having 2-12 carbon atoms in the alkyl group, a hydroxy alkyl methacrylate having 2-4 carbon atoms in the alkyl group and 0.5-40% by weight styrene and having a weight average molecular weight of about 3,000-10,000 and a glass transition temperature of −20° to +50° C.;

5-60% by weight, based on the weight of the binder of an organic polyisocyanate crosslinking agent; and a sufficient amount of catalyst to cure the binder; and wherein the coating composition when cured has a water vapor permeability value of about 1400-3200.

9. The coating composition of claim 6 in which the hydroxy acrylic polymer consists essentially of about 20-40% by weight of isobutyl metharcylate, 35-65% by weight of 2-ethylhexyl methacrylate and 15-30% by weight of 2-hydroxyethyl methacrylate.

10. The coating composition of claim 1 in which the organic polyisocyanate is an isocyanate terminated adduct of an organic diisocyanate and a polyol.

11. The coating composition of claim 10 in which the organic diisocyanate is an aromatic diisocyanate and the polyol is a trimethylol alkane.

12. The coating composition of claim 10 in which the organic diisocyanate is trimer of hexamethylene diisocyanate.

13. The coating composition of claim 1 in which the catalyst is an alkyl metal catalyst.

14. The coasting composition of claim 13 in which the catalyst is dibutyl tin dilaurate.

15. The coating composition of claim 13 in which the epoxy acrylic polymer consists essentially of 20-60% by weight of glycidyl methacrylate and 80-40% by weight of isobutyl methacrylate and the organic polyisocyanate crosslinking agent consists essentially of the trimer of hexamethylene diisocyanate.

* * * * *